United States Patent [19]
Volk et al.

[11] Patent Number: 5,944,599
[45] Date of Patent: *Aug. 31, 1999

[54] POULTRY TRUSSING DEVICE WITH PROTECTIVE CAP

[75] Inventors: Henry J. Volk, Turlock, Calif.; Daniel J. Volk, Alpharetta, Ga.

[73] Assignee: Volk Enterprises, Inc., Turlock, Calif.

[*] Notice: This patent is subject to a terminal disclaimer.

[21] Appl. No.: 08/894,214
[22] PCT Filed: Feb. 6, 1996
[86] PCT No.: PCT/US96/01797
§ 371 Date: Jul. 28, 1997
§ 102(e) Date: Jul. 28, 1997
[87] PCT Pub. No.: WO96/24253
PCT Pub. Date: Aug. 15, 1996

Related U.S. Application Data

[63] Continuation-in-part of application No. 08/384,406, Feb. 6, 1995, Pat. No. 5,451,182.

[51] Int. Cl.⁶ .................................................. A22C 21/00
[52] U.S. Cl. .............................................. 452/174; 452/176
[58] Field of Search ...................................... 452/174, 176

[56] References Cited

U.S. PATENT DOCUMENTS

| 3,895,415 | 7/1975 | Volk . |
| 4,615,075 | 10/1986 | Volk . |
| 5,102,370 | 4/1992 | Volk ........................................ 452/174 |
| 5,112,274 | 5/1992 | Volk . |
| 5,181,880 | 1/1993 | Volk . |
| 5,380,241 | 1/1995 | Volk . |
| 5,451,182 | 9/1995 | Volk ........................................ 452/176 |

*Primary Examiner*—Willis Little
*Attorney, Agent, or Firm*—Flehr Hohbach Test Albritton & Herbert LLP

[57] ABSTRACT

A poultry trussing device (25) is provided having a protective cap (30) which holds together the exposed hocks. The protective cap (30) forms a substantially smooth three-dimensional continuous surface (31–34) which grips and covers the hocks. The cap (30) is connected to an anchor (50) which is removably attached to the side portion of the backbone of the carcass.

14 Claims, 5 Drawing Sheets

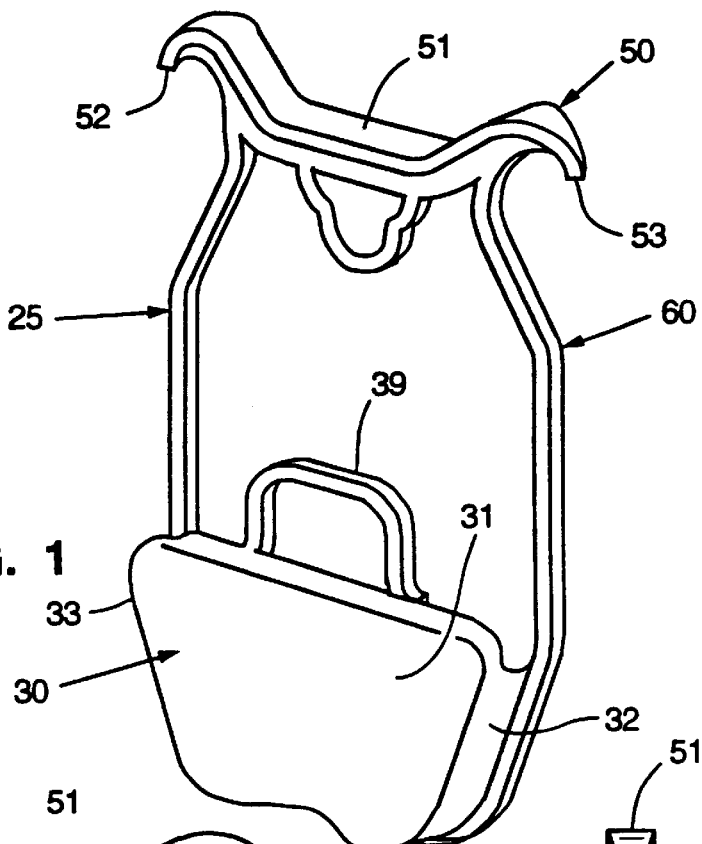
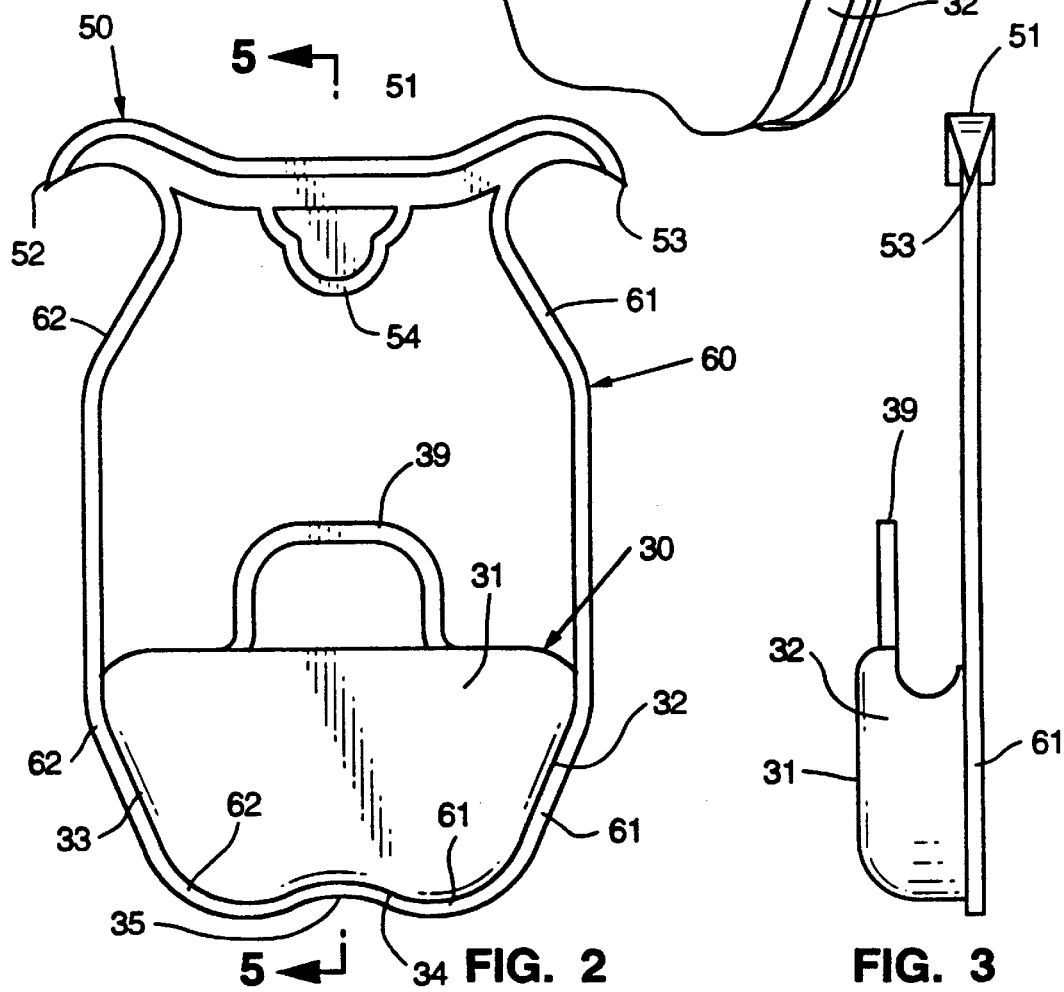
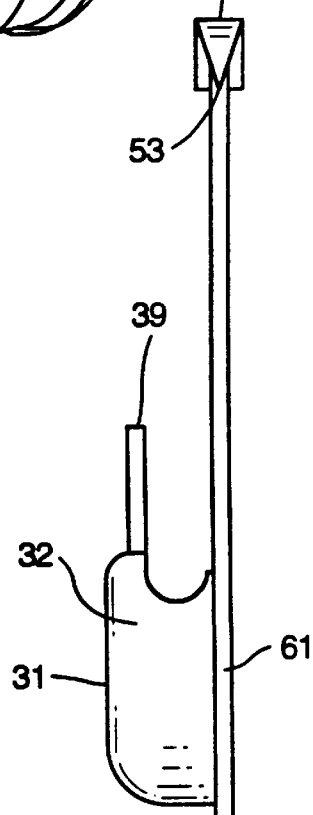
FIG. 1
FIG. 2
FIG. 3

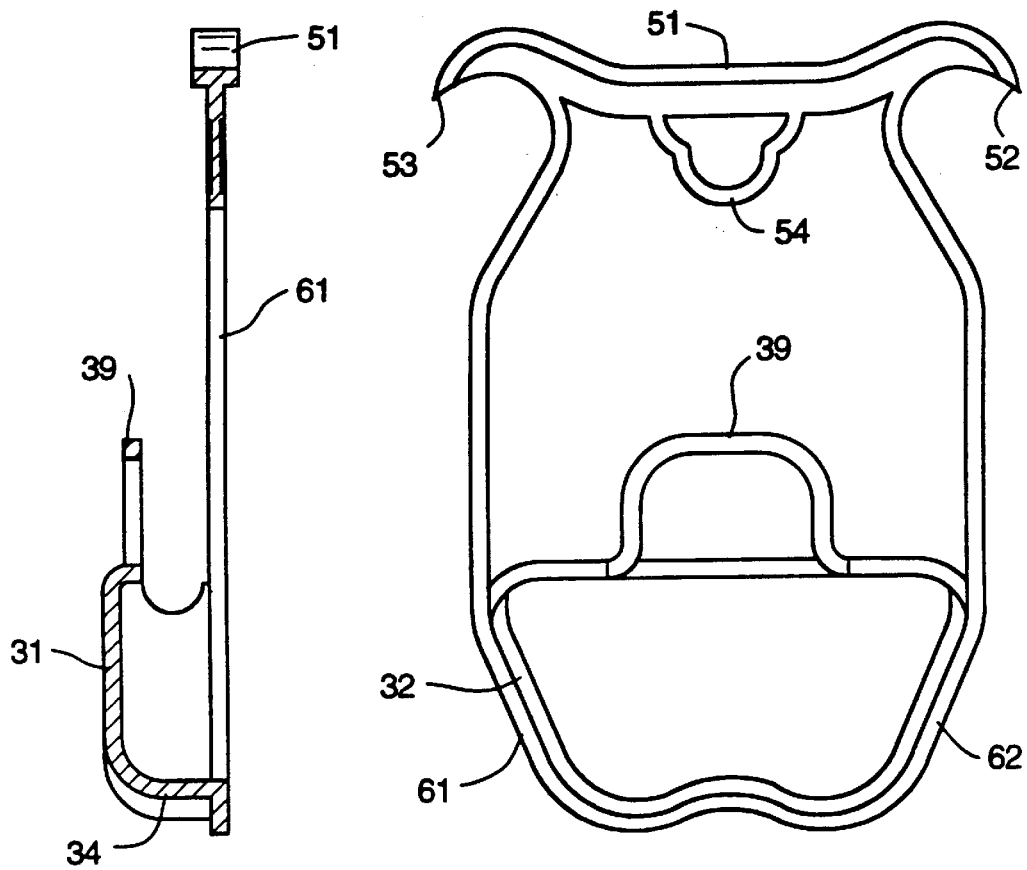
FIG. 5
FIG. 4
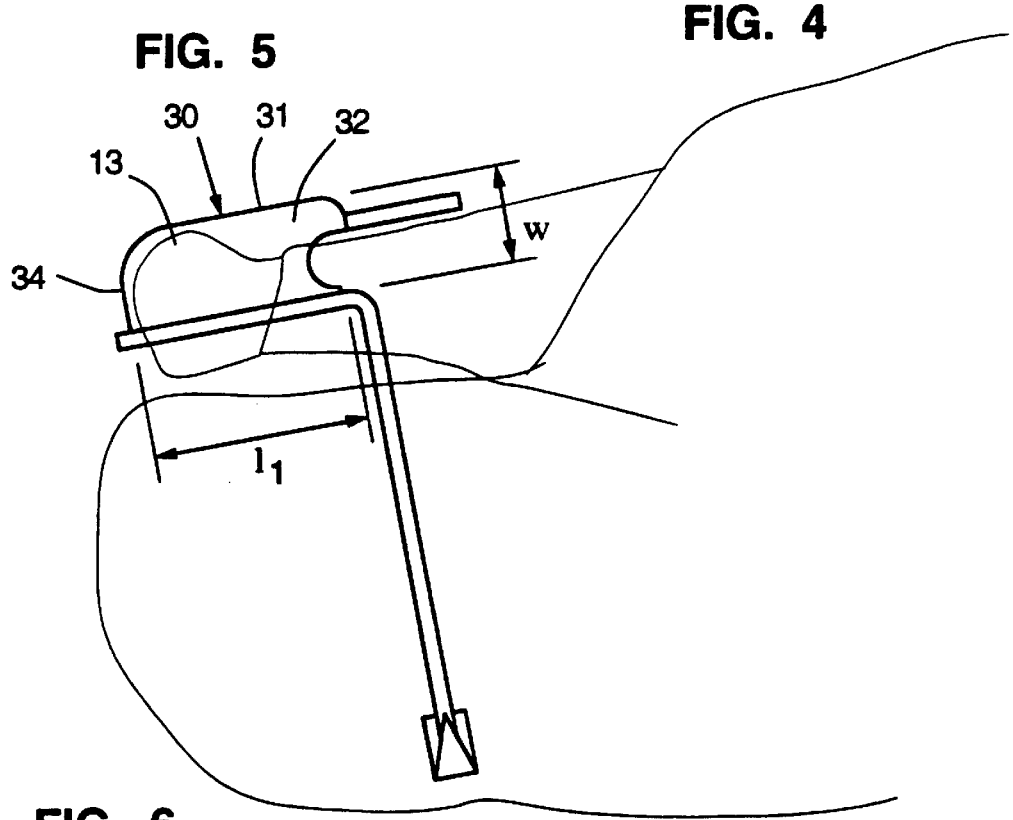
FIG. 6

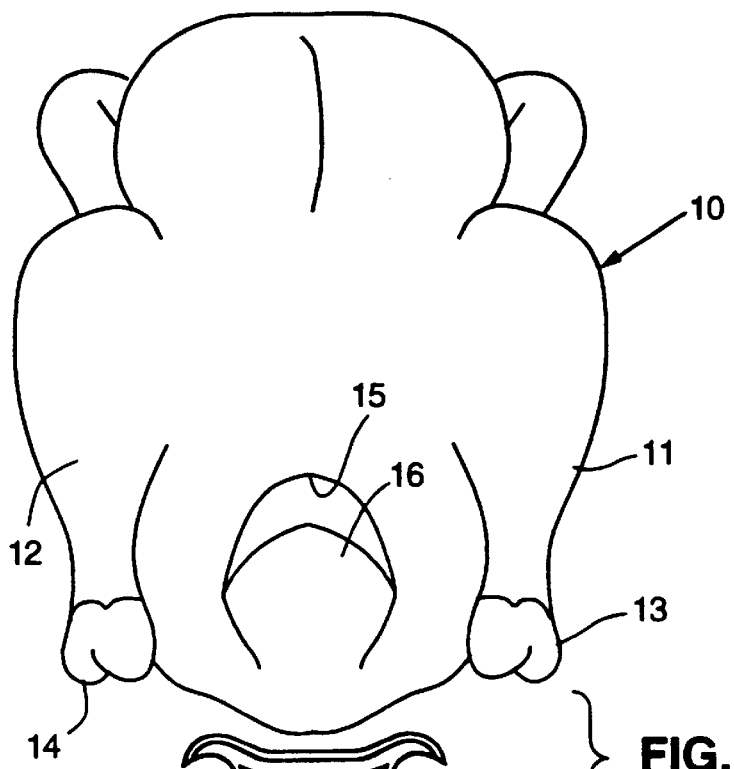
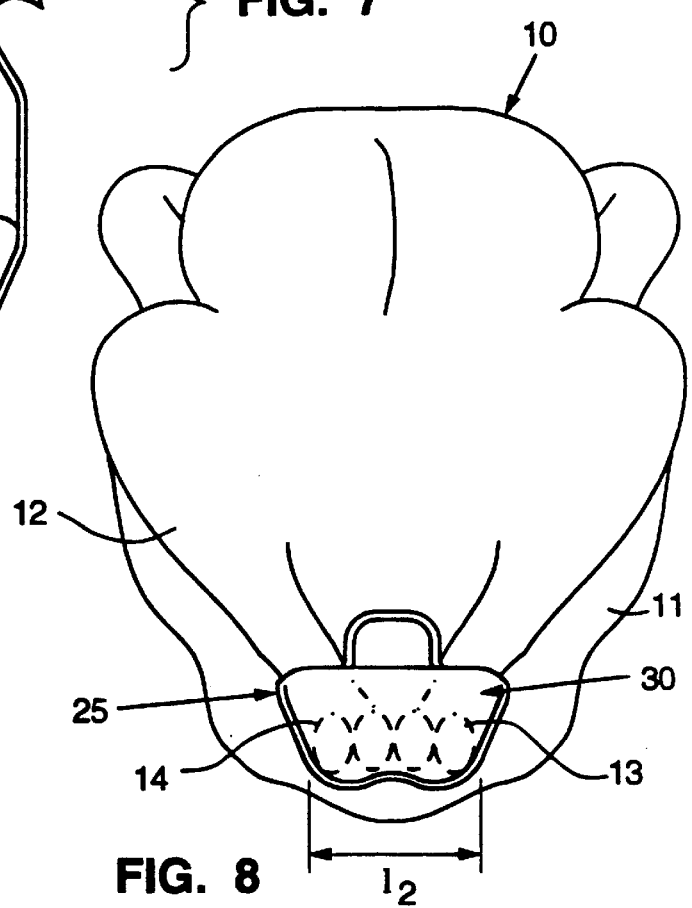

POULTRY TRUSSING DEVICE WITH PROTECTIVE CAP

This application is a national phase filing of International Application No. PCT/US96/01797 filed Feb. 6, 1996, which is a continuation-in-part of U.S. patent application Ser. No. 08/384,406 filed Feb. 6, 1995, now U.S. Pat. No. 5,451,182.

This invention relates to trussing devices for dressed poultry, and more particularly, to a trussing device for use in the commercial processing of dressed and eviscerated turkey carcasses.

Prior art poultry trussing devices include the wire retainer shown in U.S. Pat. No. 3,112,515 dated Dec. 3, 1963. The prior art also includes various plastic trussing devices such as U.S. Pat. No. 4,615,075 dated Oct. 7, 1986 and U.S. Pat. No. 4,653,146 dated Mar. 31, 1987 and U.S. Pat. No. 4,739,538 dated Apr. 26, 1988. The last three patents identified teach plastic retainers having various arrays of resilient and flexible straps which are intended to fit about and across the exposed hocks. The straps of those patents are of a rather convoluted design to permit them to be deformed so as to resiliently fit about and across the exposed hocks.

In accordance with the present invention, a trussing device is provided having a protective cap which forms a smooth three-dimensional continuous surface for gripping and covering the exposed hocks. There are several advantages of the design of the present invention over the prior art.

The present design avoids the use of straps having a complex or convoluted configuration which must be placed precisely in position to properly retain the exposed hocks. The present invention provides a single protective cap which simply holds together and covers the exposed hocks.

Secondly, according to the present invention, a protective cap is provided having a smooth surface which covers the exposed hocks and prevents any sharp edges of the exposed hocks from puncturing the plastic covering typically used to enclose the carcass by shrink wrapping.

Accordingly, it is a primary object of the present invention to provide a poultry trussing device which utilizes a single protective cap to hold together and cover the exposed hocks, avoiding the requirement of placing straps precisely in position to retain the hocks together.

A further object of the invention is to provide a poultry trussing device which prevents sharp edges of the exposed hocks from puncturing a package for the carcass such as shrunk wrap plastic.

Other objects and advantages of the invention will become apparent from the following description of the preferred embodiment and the drawings wherein FIG. 1 is a perspective view of the trussing device of the present invention.

FIG. 2 is a front elevational view of the trussing device of the present invention.

FIG. 3 is a side elevational view of the trussing device according to the present invention.

FIG. 4 is a back elevational view showing the reverse side of the trussing device as compared to the view of FIG. 2.

FIG. 5 is a section on the line 5—5 of FIG. 2.

FIG. 6 is a schematic representation showing a side view of the trussing device of the present invention as applied to a turkey carcass.

FIG. 7 is a perspective view of an eviscerated turkey carcass as the retainer of the present invention is about to be applied.

FIG. 8 is a perspective view of a dressed and eviscerated turkey carcass after the trussing device of the present invention has been applied.

Figure 9:
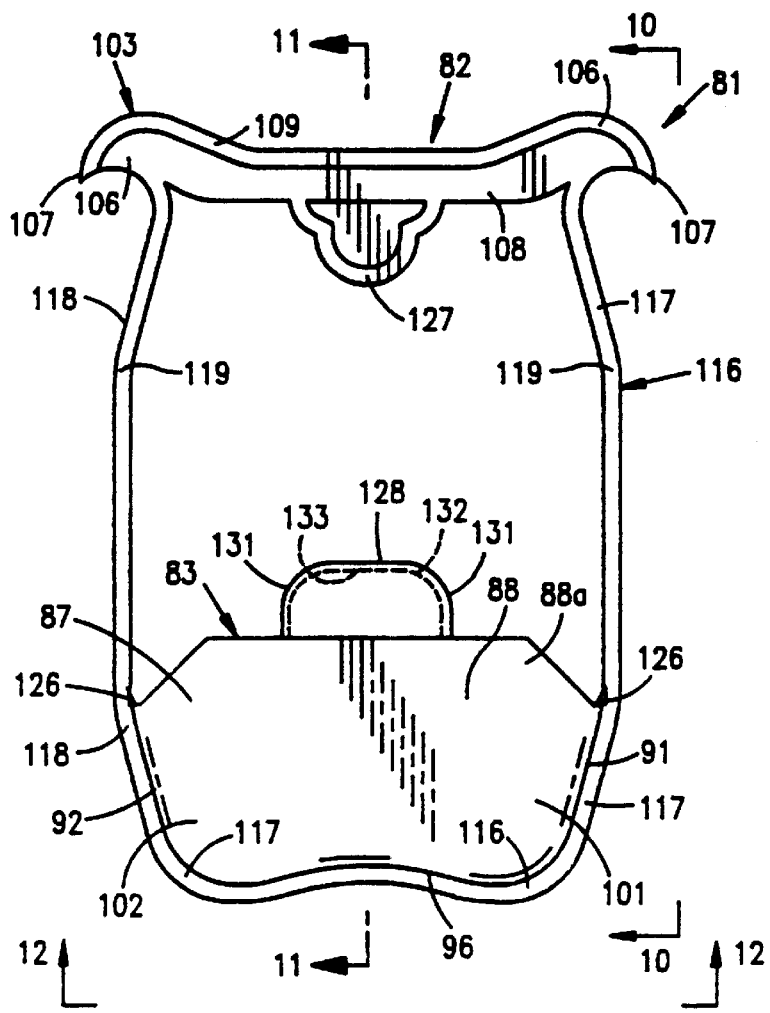
FIG. 9 is a front elevational view of another embodiment of the trussing device of the present invention.

As shown best in FIG. 7, an eviscerated turkey carcass shown generally as 10 is ready to have the trussing device shown generally as 25 of the present invention applied. After the trussing device 25 is applied, the trussed carcass 10 appears as shown in FIG. 8. The carcass 10 has legs 11 and 12 which terminate in exposed hocks 13 and 14 after the feet have been cut off from the carcass. The abdominal cavity of the carcass is eviscerated leaving an open cavity 15 and a skin flap 16. The backbone of the turkey extends along the bottom portion of the carcass in FIG. 7. The backbone is not shown in FIG. 7. As is well known, the backbone of the turkey has side portions, not shown, which are accessible through the cavity 15 for anchoring the trussing retainers of the prior art as well as the trussing device of the present invention.

In the commercial processing of turkey and other poultry carcasses, the carcasses are commonly wrapped in a plastic case which is shrink wrapped around the carcass. If the exposed hocks 13 and 14 have sharp or jagged edges, the trussing devices of the prior art allow those sharp or jagged edges to protrude and possibly puncture the plastic packaging. This typically results in the loss of the carcass as a saleable item.

As shown best in FIG. 1, the trussing device 25 of the present invention has a protective cap means 30 which is designed to hold together and cover the exposed hocks 13 and 14 as shown best in FIG. 8. Protective cap means 30 has a generally flat top surface 31 and side walls 32 and 33 and end wall 34. The side walls 32 and 33, as well as end wall 34, extend downwardly from the top surface 31. Side walls 32 and 33 have sufficient length "$l_1$," to cover the sides of the exposed hocks as shown best in FIG. 6. Side walls 32 and 33 have a width "w" which is approximately ¾ of the overall vertical height of exposed hock 13. I have found that the side walls 32 and 33, and end wall 34, should preferably extend downwardly about ¾ of the height of the exposed hocks to form a sufficiently large surface to grip and enclose hocks 13 and 14 to hold them securely in position. If the side walls extend downwardly a greater distance, the trussing device will still perform its function, but it tends to protrude upwardly more than necessary.

End wall 34 has sufficient length "$l_2$" to cover the end portions of exposed hocks 13 and 14 as shown best in FIGS. 7 and 8. The thickness of the top surface and end walls as shown best in FIG. 5 is sufficiently large to resist being punctured by a sharp edge which may be present on an exposed hock and which might otherwise puncture a plastic wrap (not shown) which is typically applied by shrink wrapping. In the preferred embodiment, the material used is nylon and the thickness of the protective cap means is approximately 0.010 inches. This thickness also provides sufficient rigidity for the protective cap means 30 to retain its shape during and after shrink wrapping. Other materials than nylon may be utilized if approved by the United States Department of Agriculture for food products. The dimensions for "$l_1$", "$l_2$" and "w" will vary depending on the size of the turkey, or other fowl, being trussed.

The protective cap means 30 provides a relatively smooth three-dimensional continuous surface which grips and encloses the exposed hocks as shown best in FIG. 6. The side walls 32 and 33 are angularly disposed relative to each other as shown in FIG. 2. Side walls 32 and 33 form an angle of approximately 30–45° relative to each other so as to accept the legs 11 and 12 when folded inwardly as shown in FIG. 8. Tab 39 is carried by protective cap means and facilitates the manipulation required to insert the hocks into the cap and to remove the hocks from the cap.

An anchor means 50 is provided which includes a bar 51 having curved and upwardly extending ends 52 and 53 for engaging the side portions of the turkey backbone. Tab 54 is carried by bar 51 to facilitate insertion and removal of the trussing device 25 from the cavity 15 of carcass 10.

Connecting means 60 is provided for connecting the protective cap means to the anchor means 50. Connecting means 60 includes a pair of straps 61 and 62 which extend from the ends of bar 51 to the protective cap means 30. Connecting strap 61 extends around the base of side wall 32 and to the center of end wall 34. Strap 62 extends along the bottom of side wall 33 and to the central portion of end wall 34.

In operation, the trussing device of this invention may be applied to the carcasses as quickly and easily as any device presently on the market. The trussing device of the present invention affords a positive and secure mechanism to hold the hocks together. The cap improves the appearance of the packaged poultry in that it hides the unattractive showing of hocks but, more importantly, it prevents any sharp or jagged edges of the exposed hocks from puncturing the plastic cover for the trussed carcass.

It should be appreciated that other embodiments of the poultry trussing device hereinabove described can be provided and be within the scope of the present invention. For example, a trussing device 81 similar to trussing device 25 is illustrated in FIGS. 9–12. Trussing device 81 is formed from a unitary body 82 made from any suitable material such as nylon. Body includes protective cap means in the form of protective cap 83 which is substantially similar to cap means 30 and forms an inner cavity 84 having an open end 86. More specifically, cap 83 is provided with a substantially smooth three-dimensional continuous outer surface 87 formed by a generally flat top wall 88 and first and second opposite side walls 91 and 92 substantially similar to top surface 31 and side walls 32 and 33 described above. The top wall 88 has an arcuately depending central portion 88a which curves downwardly into cavity opening 86. Each of side walls 91 and 92 has a bottom surface 93, which together extend generally in a plane, and a side surface 94 disposed at a right angle to the bottom surface. Side surfaces 94 form the side of cavity opening 86. An end wall 96 extends between side walls 91 and 92. The walls 91, 92 and 96 are disposed at a relatively right angle to top wall 88 and joined to the top wall 88 by a rounded corner 97 which extends around the periphery of the top wall 88.

Figure 10:
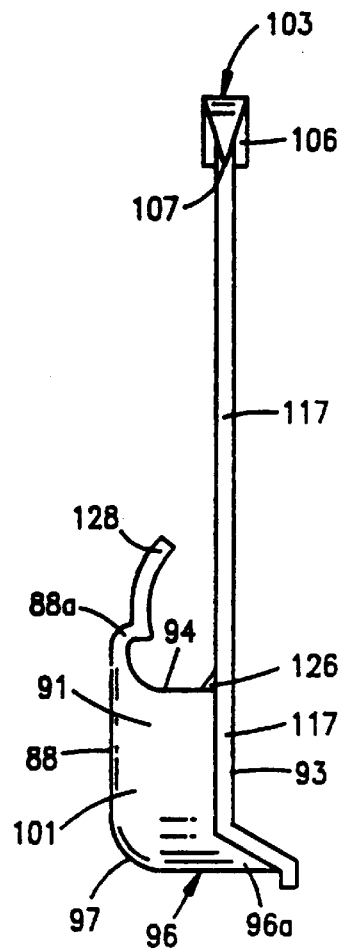
FIG. 10 is a side elevational view of the trussing device of FIG. 9 taken along the line 10—10 of FIG. 9.
Figure 12:
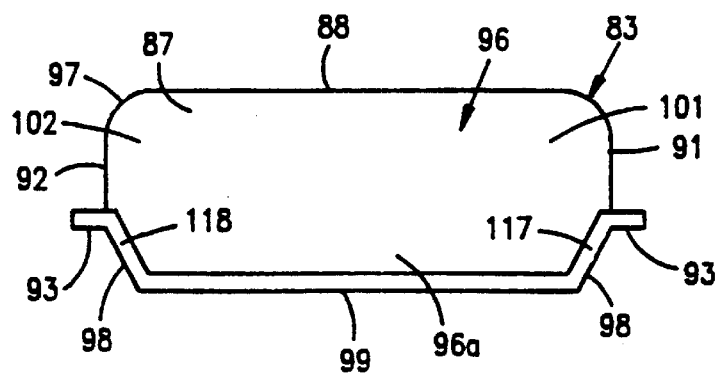
FIG. 12 is an end elevational view of the trussing device of FIG. 9 taken along the line 12—12 of FIG. 9.
Figure 11:
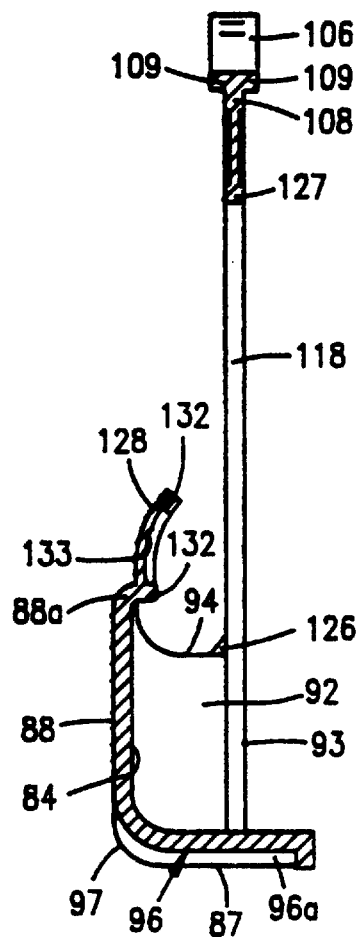
FIG. 11 is a cross-sectional view of the trussing device of FIG. 9 taken along the line 11—11 of FIG. 9.

End wall 96 includes a lower portion 96a which extends downwardly below the bottom surfaces 93 of side walls 91 and 92 (see FIGS. 10–12). Lower portion 96a is formed from first and second opposite sides surfaces 98 which are inclined from respective bottom surfaces 93 of sides walls 91 and 92 at an angle of approximately 45° relative to the plane of surfaces 93 and extend to a bottom surface 99 of the end wall 93 disposed in a plane parallel to the plane of surfaces 93 (see FIG. 12).

As shown in FIG. 9, generally planar side walls 91 and 92 are disposed relative to each other and at an angle of approximately 30–45° and as thus incline inwardly toward each other. End wall 96 bows inwardly toward front opening 86 of cavity 84 so as to provide cap 83 with first and second side by side bulbous portions 101 and 102. Side walls 91 and 92 have a length "$L_1$" and a width "W" substantially similar to the length and width of side walls 32 and 33 discussed above. Similarly, end wall 96 has a length "$L_2$" substantially similar to the length of end wall 34 discussed above.

Body 82 further includes anchor means in the form of an elongate attachment bar 103 substantially similar to bar 51 described above and having first and second opposite curved end portions 106 with upturned ends 107. Bar 103 includes a planar element 108 and first and second opposite strengthening ribs 109 extending at an approximately right angle from the bottom of each side of the element 108.

Connecting means 116 substantially similar to connecting means 60 described above is included within body 82 for attaching protective cap 83 to attachment bar 103. Connecting means 116 includes first and second spaced-apart elongate legs or straps 117 and 118 which extend from the ends of respective first and second side walls 91 and 92 at front opening 86 of cavity 84 to respective first and second curved end portions 106 of the attachment bar 103. Straps 117 to 118 extend from protective cap 83 in generally parallel directions before extending inwardly toward each other at aligned curves 119. Straps 117 and 118 extend along the base of cap 83 and so form bottom surfaces 93 of side walls 91 and 92 and side surfaces 98 of end wall lower portion 96a. Straps 117 and 118 continue toward each other to meet at the center of the bottom surface 99 of lower wall portion 96a. A strengthening rib 126 is provided on body 82 where each strap 117 and 118 adjoins protective cap 83. Each strengthening rib 126 is generally triangular in shape with the hypotenuse of the triangular extending between the side surface 94 of side wall 91 or 92 to the strap 117 or 118.

First and second tab means are included within body 82 for facilitating its attachment to the eviscerated turkey carcass 10. First tab means in the form of attachment bar tab 127 is substantially similar to tab 54 described above and extends upwardly from the center of attachment bar 103 in the plane of bar element 108 toward protective cap 83. Second tab means in the form of protective cap tab 128 extends outwardly from the central depending portion 88a of top wall 88. Tab 128, as shown in FIG. 9, is formed with first and second opposite side surfaces 131 which curve toward each other as tab 128 extends toward attachment bar 103. The tab 128 has an arcuate cross-section, as shown in FIGS. 10 and 11, and thus bends downwardly toward straps 117 and 118 as it extends outwardly from the protective cap 83. A rim 132 extends around the bottom periphery of tab 128 so as to provide a recess 133 which opens onto the bottom of the tab 128.

In operation and use, trussing device 81 is mounted to eviscerated turkey carcass 10 in the manner described above with respect to trussing device 25. In this regard, bar tab 127 is grasped by the fingers of the human installer so that attachment bar 103 can be inserted into cavity 15 and curved end portions 106 disposed within the kidney cavities of the carcass 10 in a conventional manner. The downwardly curved configuration of cap tab 128 facilitates the quick grasping of the tab 128 by a finger of either hand when placing hocks 13 and 14 within the protective cap 83. In one preferred method of inserting the hocks in cap 83, the palm of the hand is placed over cap 83 when top wall 88 is facing the installer. The depending thumb is then placed under tab 128 and used to pull the tab 128 upwardly so as to pivot cap 83 away from the installer to an approximate right angle relative to the then upstanding straps 117 and 118. Peripheral rim 132 on the underside of cap tab 128 makes gripping of the tab 128 easy. Hocks 13 and 14 are then sequentially placed within respective first and second bulbous portions 101 and 102 of protective cap 83 so as to be disposed therein as shown in FIGS. 6 and 8 with respect to trussing device 25.

The bulbous shape of cap portions 101 and 102 and the inward tapering of protective cap 83 toward end wall 96 cause the cap to snugly engage hocks 13 and 14. Depending wall portion 88a and particularly cap tab 128 protruding therebeyond extend between carcass legs 11 and 12 and serve to center the legs and inhibit dislodging of hocks 13 and 14 from trussing device 81. The relatively sharp edges on the undersides of depending wall portion 88a and cap tab 128 tend to dig into legs 11 and 12 and thus further inhibit movement thereof. The engagement of tab 128 with carcass legs 11 and 12 also precludes protective cap 83 from pivoting back upwardly to its upright position. In this manner, tab 128 assists in retaining cap 83 in its operational position about hocks 13 and 14.

Reinforcing ribs 109 serve to strengthen body 82 and inhibit breaking of straps 117 and 118 where they adjoin protective cap 83 when trussing device 81 is bent as shown in FIG. 6 with respect to trussing device 25.

Lower portion 96a of cap end wall 96 further inhibits dislodging of hocks 13 and 14 from cap cavity 84. This is particularly important where hocks 13 and 14 are relatively small in comparison to cap bulbous portions 101 and 102 and thus capable of moving about within cavity 84. When trussing device 81 is mounted on such small hocks, end wall 96 has a sufficient width to cover the vertical height of the exposed hocks. As such, end wall lower portion 96a would extend downwardly to the bottom of the hocks when viewed in a manner similar to FIG. 6 with respect to trussing device 25. Thus, the inclusion of end wall lower portion 96a permits a single trussing device 81 to be used with eviscerated carcasses of varying sizes.

The relatively smooth and continuous outer surface 87 of cap 83 prevents any sharp or jagged edges of the exposed hocks 13 and 14 from puncturing the plastic cover of the trussed carcass 10. Cap 83 further serves to hide cavity opening 86 and thus provide the trussed carcass 10 with a relatively pleasant appearance. Lower portion 96a of end wall 96 provides greater coverage of opening 86 by extending downwardly over the cavity opening 86.

Cap tab 128 is easily grasped by the finger of a human hand for removing trussing device 81 from the carcass 10. The finger is placed between legs 11 and 12 and below tab 128 in this regard. The arcuately depending configuration and rimmed underside of tab 128 facilitate quick and easy manipulation of the tab 128 in this regard.

Figure 13:
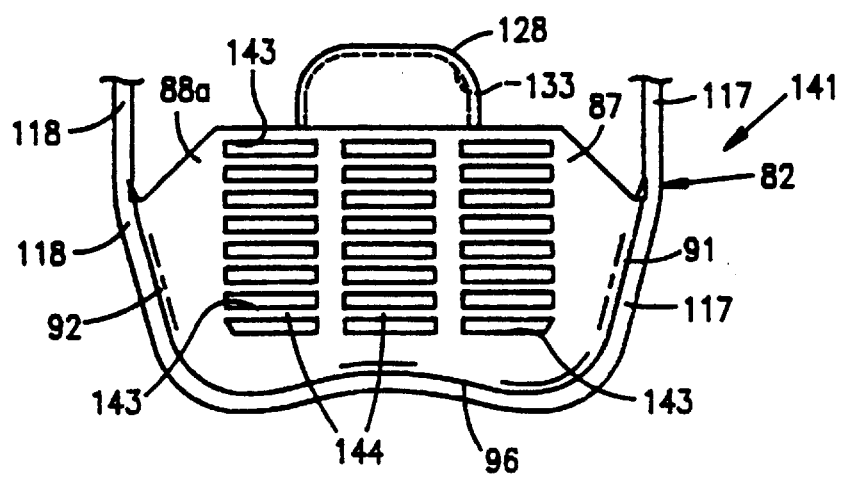
FIG. 13 is a front elevational view of a portion of another embodiment of the trussing device of the present invention.

Another embodiment of the trussing device is shown in FIG. 13 where a portion of trussing device 141 is shown. Trussing device 141 is substantially identical to trussing device 81 and similar reference numerals have been utilized to describe like parts of trussing devices 81 and 141. Body 82 of trussing device 141 includes a protective cap 142 substantially identical to protective cap 83 and provided with an outer surface 87, a top wall 88, first and second side walls 91 and 92 and an end wall 96. Cap 142 is further provided with a plurality of perforations or holes 143 extending through outer surface 87. Holes 143 are rectangular in shape and spaced apart across surface 87 in parallel alignment to thus form a plurality of strap-like elements 144.

Trussing device 141 is utilized in substantially the same manner as trussing devices 25 and 81 described above. Holes 143 reduce the mass and material composition of protective cap 142 and thus the cost of trussing device 141. The size and shape of holes 143 are sufficiently small to preclude any portion of hocks 13 and 14 from protruding therethrough and puncturing the plastic covering of trussed carcass 10. Holes 143 are further shaped and sized so as not to compromise the structural integrity of protective cap 83 and to further provide cap 83 with an aesthetically pleasing appearance. Strap elements 144 extend in a lengthwise direction across cap 83 to inhibit separation of the strap elements as they engage hocks 13 and 14. Surface 87 is substantially smooth and continuous and free of sharp corners or edges capable of tearing or piercing the plastic covering. Although holes 143 are shown as being rectangular in shape, it should be appreciated that holes having a circular or other shape can be provided and be within a scope of the present invention.

What is claimed is:

1. An apparatus for trussing a dressed and eviscerated poultry carcass, wherein the legs of said poultry carcass when dressed terminate in exposed hocks and wherein the framework of the poultry carcass is exposed in the eviscerated cavity, comprising a protective cap adapted for holding said exposed hocks together, said protective cap forming a substantially smooth, three-dimensional continuous surface which grips and covers said exposed hocks, and attachment means removably connectable to the framework of said poultry carcass and connected to said protective cap.

2. The apparatus of claim 1 wherein said protective cap forms a generally rigid surface which holds its shape when a shrink wrapping is applied over said carcass and said protective cap.

3. The apparatus of claim 2 wherein said protective cap comprises a generally flat top surface having sufficient length and width to cover the tops of said exposed hocks, two side walls extending downwardly from said top surface having sufficient length to cover the sides of said exposed hocks and having a sufficient width to cover approximately ¾ of the vertical height of said exposed hocks, and an end wall extending downwardly from said top surface having sufficient length to cover the ends of said exposed hocks and having a sufficient width to cover at least approximately ¾ of the vertical height of said exposed hocks.

4. The apparatus of claim 3 wherein the end wall has a sufficient width to cover the vertical height of said exposed hocks.

5. The apparatus of claim 3 wherein said side walls are oriented at an angle of between 30° and 45° with respect to each other.

6. The apparatus of claim 1 wherein said protective cap is made of nylon and is sufficiently thick to resist being punctured by a sharp edge which may be present on one of said exposed hocks.

7. The apparatus of claim 1 wherein said protective cap is provided with a plurality of holes extending through the surface for reducing the mass of the protective cap.

8. An apparatus for trussing a body of eviscerated poultry having legs terminating in exposed hocks comprising a protective cap adapted for holding said exposed hocks together, said protective cap forming a substantially smooth, three-dimensional continuous surface which grips and covers said exposed hocks, and attachment means attachable to said body of eviscerated poultry and connected to said protective cap.

9. The apparatus of claim 8 wherein said protective cap forms a generally rigid surface which holds its shape when a shrink wrapping is applied over said body of eviscerated poultry and said protective cap.

10. The apparatus of claim 9 wherein said protective cap comprises a generally flat top surface having sufficient length and width to cover the tops of said exposed hocks, two side walls extending downwardly from said top surface having sufficient length to cover the sides of said exposed hocks and having a sufficient width to cover approximately ¾ of the vertical height of said exposed hocks, and an end wall extending downwardly from said top surface having sufficient length to cover the ends of said exposed hocks and having a sufficient width to cover at least approximately ¾ of the vertical height of said exposed hocks.

11. The apparatus of claim 10 wherein said end wall has a sufficient width to cover the vertical height of said exposed hocks.

12. The apparatus of claim 10 wherein said side walls are oriented at an angle of between 30° and 45° with respect to each other.

13. The apparatus of claim 8 wherein said protective cap is made of nylon and is sufficiently thick to resist being punctured by a sharp edge which may be present on one of said exposed hocks.

14. The apparatus of claim 8 wherein said protective cap is provided with a plurality of holes extending through the surface for reducing the mass of the protective cap.

* * * * *